United States Patent [19]

Forshee

[11] Patent Number: 4,467,911

[45] Date of Patent: Aug. 28, 1984

[54] PLASTIC CLEVIS FOR CONVEYOR TROLLEY AND HANGER

[75] Inventor: David J. Forshee, Hilton Head, S.C.

[73] Assignee: Formall Syn-Trac Systems, Inc., Madison Heights, Mich.

[21] Appl. No.: 398,402

[22] Filed: Jul. 14, 1982

[51] Int. Cl.³ .............................................. B65G 17/32
[52] U.S. Cl. ..................................... 198/648; 198/687
[58] Field of Search ............. 198/648, 687, 678, 473, 198/680, 646; 403/150, 163, 206, 213; 105/154, 148; 104/95, 94, 93; 17/44.2, 24

[56] References Cited

U.S. PATENT DOCUMENTS

| | | | |
|---|---|---|---|
| 3,171,536 | 3/1965 | Johnson | 198/680 |
| 3,777,872 | 12/1973 | Rikman et al. | 198/687 |
| 3,926,303 | 12/1975 | McCall | 105/148 |
| 3,927,760 | 12/1975 | McCall | 198/648 |
| 4,228,738 | 10/1980 | Forshee | 198/687 |

FOREIGN PATENT DOCUMENTS

| | | | |
|---|---|---|---|
| 2043569 | 10/1980 | United Kingdom | 198/473 |
| 328183 | 3/1972 | U.S.S.R. | 198/678 |

Primary Examiner—Joseph E. Valenza
Assistant Examiner—Daniel R. Alexander
Attorney, Agent, or Firm—Benjamin W. Colman

[57] ABSTRACT

A two-piece plastic clevis device for a monorail conveyor trolley system, the device having an upper trolley connected member and a manually engageable and disengageable lower clevis member which is connected to and supports a parts carrying hanger. The upper clevis member has a flanged member on each side of a medial plate or stem, the lower member having a pair of spaced apart hub-supported arcuate bodies that engage the flanged members on each side of the medial plate and suspend the hanger at and from the surfaces of engagement.

12 Claims, 8 Drawing Figures

PLASTIC CLEVIS FOR CONVEYOR TROLLEY AND HANGER

BACKGROUND OF THE INVENTION

This invention relates to a plastic clevis for use with a monorail conveyor trolley and hanger.

Conventional clevis devices currently in use are affixed by conventional bolt-type fasteners to a trolley thereabove and to a suspended parts carrying hanger therebelow. The clevis member is positioned intermediate the trolley and the hanger. Conventional clevis devices require skilled maintenance workers to install and disconnect such components of a conveyor system, personnel who receive relatively high rates of pay and are relatively few in number. Additionally, much time is consumed in removing a damaged conventional steel clevis device from its trolley. Steel clevis members are not easily repaired when damaged, requiring skilled welders to fix them, again at relatively high rates of pay and a fair amount of time.

Identification and safety coatings are not applied to steel conveyor clevis members. Paint will not remain for long on such members due to the usual presence of oily or corrosive vapors in the environmental atmospheres in which industrial conveyors generally operate.

Additionally, steel clevis members usually suspend a steel hanger therebelow and there is often a squeaking noise from the connection when it becomes dry, requiring lubrication.

The foregoing limitations, defects or objections are avoided by the plastic conveyor clevis member of the invention disclosed herein.

SUMMARY OF THE INVENTION

The invention involves a plastic two-piece clevis device which is manually separable without the aid of any tools, can be permanently colored for identification and safety purposes, is quiet in operation and requires no lubrication, is readily installed, and will support loads equal to or greater than those carried by a steel clevis of comparable size.

The clevis of this invention is made of a plastic material such for example as the DuPont Zytel ® ST nylon polyamide or DuPont's Delrin ® acetal resin, produced by the E. I. DuPont de Nemours & Co. of Wilmington, Delaware. The plastic materials are readily molded and moldable into many intricate shapes. If considered necessary, the plastic materials can be strengthened by incorporating fiberglass filaments therein according to practices well known in the art.

The upper member of the plastic clevis device is attached to the conveyor trolley between the arms of the trolley as the pendant portion thereof. The lower clevis member is affixed to the parts carrying hanger. Conventional fasteners, such as bolts, washers and nuts, are used to secure and affix the clevis members to their respective trolley and hanger.

The upper clevis member has an upstanding medial stem or blade terminating at its lower distal end in arcuate slots, one on each side of the stem, and parallel and adjacent thereto. The slots are each defined by an outer flange providing a base and a lateral rib for the slot.

The lower clevis member has a base plate adapted to be affixed to the upper portion of the parts carrying hanger, and a pair of spaced apart arcuate bodies adapted to enter the slots of the upper clevis member on each side of its stem and to ride or swing in those slots or upon their adjacent flanges, whereby the lower clevis member is easily manually connected to and disconnected from the upper clevis member.

Since a clevis is an intermediate connector device, making it of two manually separable members significantly enhances its effectiveness and utility, particularly if the members provide the added benefits of identification and safety, noise and lubrication elimination, and strength in carrying the conveyor hanger loads.

BRIEF DESCRIPTION OF THE DRAWINGS

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which.

DESCRIPTION OF THE PERFERRED EMBODIMENTS

Figure 1:
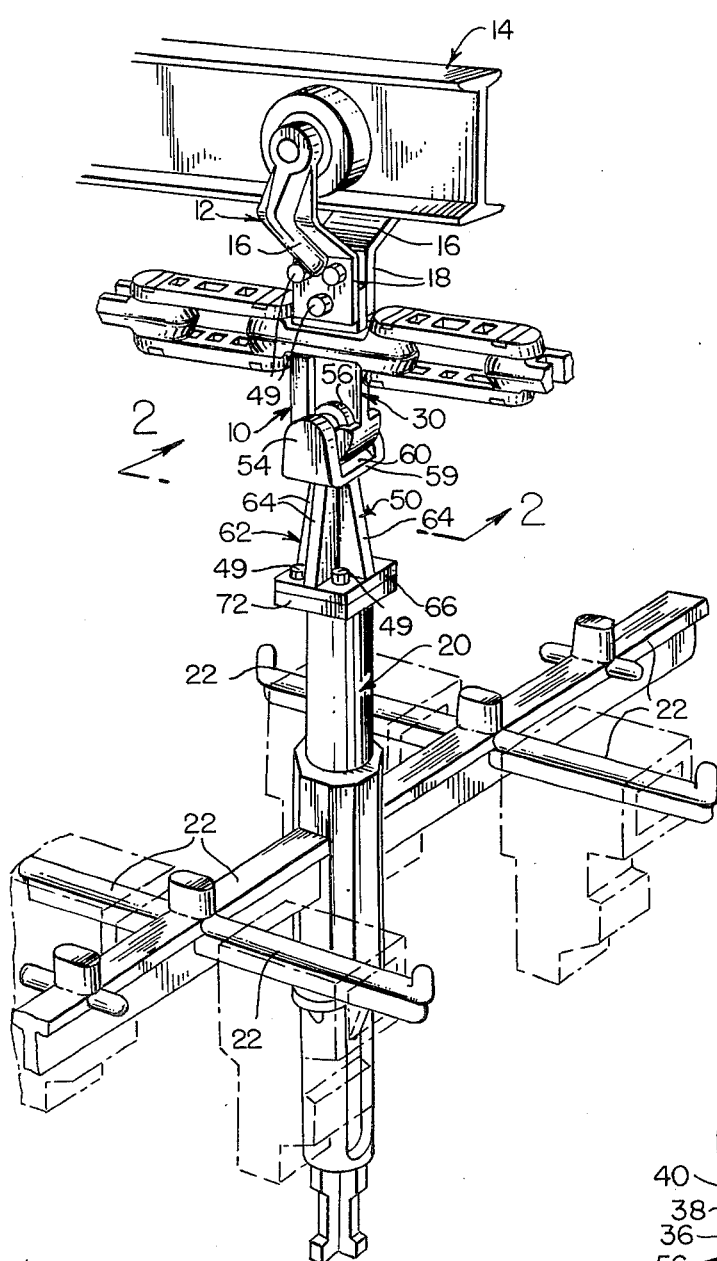
FIG. 1 is a perspective view of a fragmentary part of a monorail conveyor system showing a trolley and parts carrying hanger connected by a plastic clevis device embodying the invention.
Figure 2:
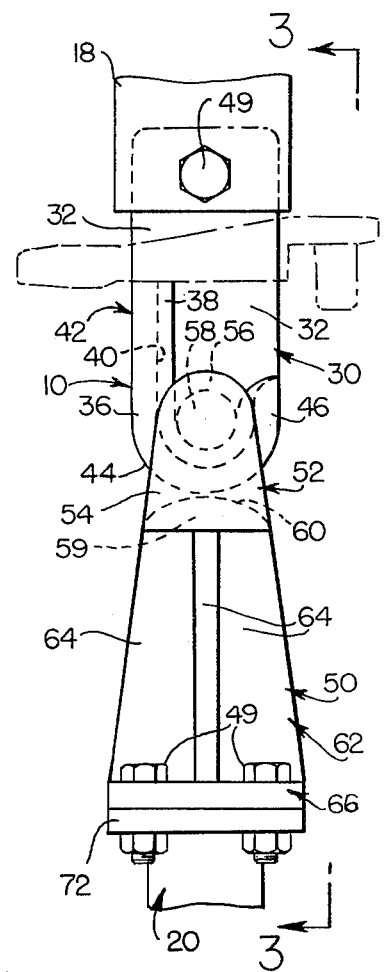
FIG. 2 is a side elevational view of the clevis device taken substantially on the line 2—2 of FIG. 1.
Figure 3:
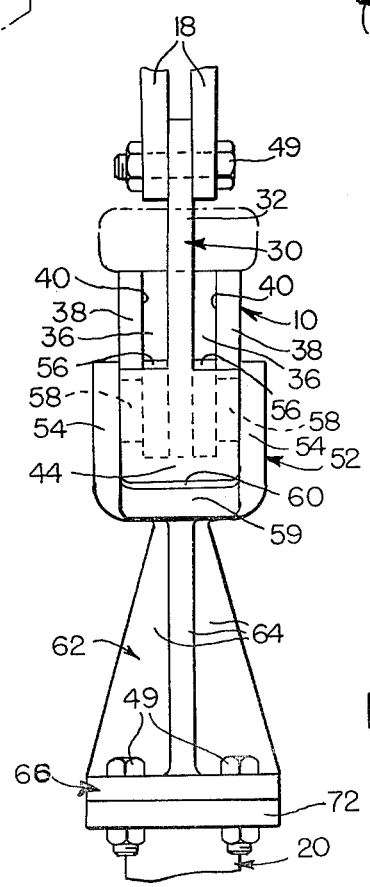
FIG. 3 is a front elevational view of the clevis device taken substantially on the line 3—3 of FIG. 2.
Figure 4:
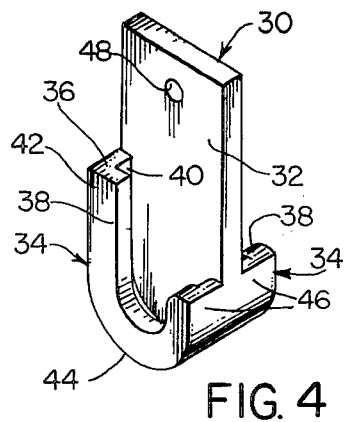
FIGS. 4 and 5 are perspective views of the upper and lower clevis members respectively.
Figure 5:
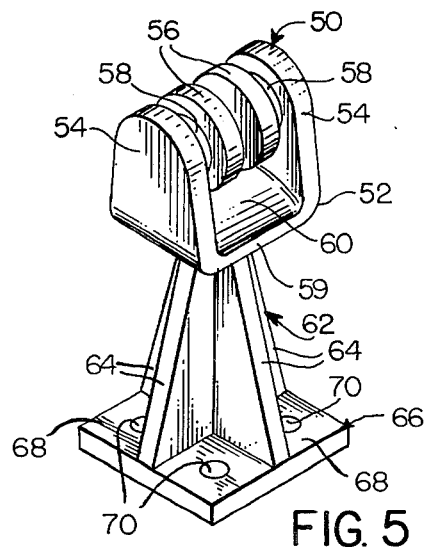

As shown in the several views of the drawings, and particularly in FIGS. 1, 2 and 3, the plastic clevis device 10 is connected to and suspended from a monorail conveyor trolley 12 rollingly translatable upon a monorail track 14. The trolley 12 comprises a pair of arms 16,16 having legs 18,18 forming a yoke at their lower ends. The lowermost end of the clevis device 10 is connected to and supports a parts carrying hanger 20 which may have a number of arms 22 onto which parts to be carried by the trolley can be loaded.

The plastic clevis device 10 comprises a plastic upper trolley connected member 30 and a manually separable plastic lower hanger connected member 50. Each member 30 and 50 is an integrally formed, unitary, molded plastic unit.

The upper clevis member 30 comprises an upstanding medial plate or stem 32, a flange member 34 along a portion of the perimeter of and on each side of the plate 32 having a base 36 and a lateral rib 38 substantially parallel with and spaced laterally outwardly from the plate 32 to define a slot 40 therebetween. The flange member 34 has a vertical straight portion 42 blending into a lower arcuate portion 44 at the lower end of the member 30 and an upwardly extending arcuate portion 46. The slot 40 is arcuate where defined by the base 36 and rib portions 44 and 46. The upper end of the arcuate portion 46 is somewhat below the upper end of the vertical straight portion 42 and is beveled and rounded at its distal end to provide an easy entry lip for engagement and disengagement by the lower clevis member 50. The upper end of the medial plate 32 is provided with an opening 48 for passage of a fastener bolt 49 therethrough, securing the clevis member 30 to the trolley legs 18,18.

The lower clevis member 50 comprises an upper yoke 52 having a pair of spaced apart upstanding trunnions or plate members 54,54 each supporting an annular flanged arcuate body or cylinder 56 projecting inwardly toward but spaced apart from each other a distance slightly greater than the thickness of the upper clevis member medial stem or plate 32 and mounted upon a hub 58; intermediate web portion 59 having an arcuate convexly curved upper surface 60 between the trunnions 54,54, the upper surface 60 of the web portion being spaced from the lower adjacent surfaces of the annular flanged cylinders 56 a distance somewhat greater than the thickness of the base 36 of the upper clevis member 30 but not greater than the combined thickness of the base 36 and the height of the lateral rib 38; and a column 62 formed of four vertical ribs 64 at right angles to each other in a cross-sectional cruciform arrangement and dividing the base plate 66 into quadrants 68. Each quadrant is provided with an opening 70 for passage of bolt-type fasteners 49 therethrough to removably connect the upper plate 72 of the hanger 20 to the lower clevis member 50.

Figure 6:
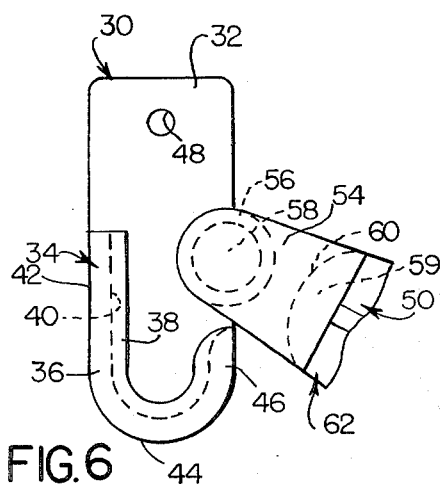
FIGS. 6, 7 and 8 are side elevational views of the upper and lower clevis members in stages of interconnection.
Figure 7:
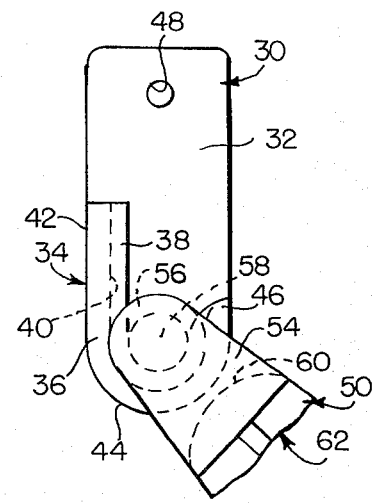
Figure 8:
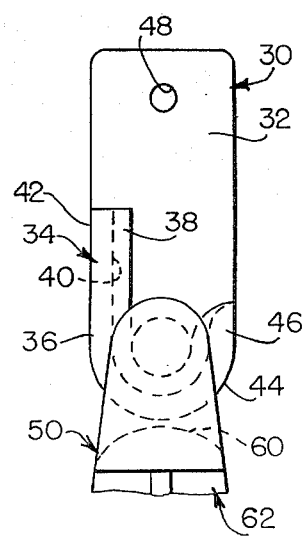

To mount the clevis 10 upon the trolley 12, the medial plate 32 of the upper clevis member 30 is inserted between the trolley arm legs 18,18 until the openings transversely therethrough are in alignment and a bolt-type fastener is passed therethrough securing the member 30 to the trolley. The lower clevis member 50 is secured to a hanger 20 by bolt-type fasteners 49 passed through openings 70 in the base plate 66 and corresponding openings in register through the hanger upper plate 72. The lower clevis member cylinders 56,56 are then introduced to and on either side of the upper clevis member medial plate 32 which passes therebetween, and the member 50 is then rotated downwardly upon the flange member portion 46 which enters the space between the lower cylindrical surface of the hub 58 and the upper convexly curved surface 60 of the yoke web portion 59. Clockwise rotation (FIGS. 6, 7 and 8) of the lower clevis member 50 continues until the member 50 is vertically aligned with the upper clevis member 30 and the former hangs suspended from the latter.

The lateral ribs 38 of the flange members 34 and the medial plate 32 limit lateral travel and displacement of the yoke cylinders 56,56, the yoke trunnions 54,54 being outwardly of the ribs 38. The distance between the inside surface of each yoke trunnion 54 to the outer facing end surface of the cylinder 56 is slightly greater than the thickness of the lateral rib 38. The depth of the slot 40 from the distal edge of the lateral rib 38 to the inside surface of the base 36 can be less than the difference between the radius of the hub 58 and the radius of the cylinder 56. If it is, then the outer surface of the cylinder will ride on the inside surface of the base 36, if it is not then hub 58 will ride on the periphery or distal edge of the lateral rib 38. The thickness or length of the cylinder 56 is such that it is less than the width of the slot 40, i.e. the distance from the inner surface of the lateral rib 38 to the adjacent face of the medial plate 32 is greater than the thickness or length of cylinder 56.

Similarly, the distance from the apex of the convexly crowned surface 60 of the web portion 59 to the adjacent surfaces of the hubs 58,58 is slightly or somewhat greater than the combined thickness of the base 36 and the height of the lateral rib 38; and the distance from the apex of the convexly crowned surface 60 to the adjacent surfaces of the cylinders 56,56 is slightly or somewhat greater than the thickness of the base 36 but less than the combined thickness of the base 36 and the height of the lateral rib 38.

The facile manual engagement and disengagement of the upper and lower clevis members 30 and 50 attest to the merit of the inventive construction that solves an expensive time-consuming problem in current conveyor trolley/hanger operation and maintenance. Color coding the plastic clevis 10 for identification and safety purposes, and the elimination of lubrication equipment and its operation, are additional advantages over the use and operation of currently available steel clevis devices.

Having disclosed herein certain particular embodiments of the invention for purposes of explanation, further modications or variations thereof, after study of this specification, will or may occur or become apparent to persons skilled in the art to which the invention pertains. Reference should be had to the appended claims in determining the scope of the invention.

I claim:

1. A plastic two-piece clevis device for manually detachably mounting a parts carrying hanger from a monorail conveyor trolley comprising:

a plastic upper clevis member having a medial plate the upper end of which is detachably connected to said trolley, and a flange member having a base and a lateral rib spaced outwardly from and on each side of said medial plate defining a slot therebetween, and a plastic lower clevis member having a yoke at its upper end supporting a pair of spaced apart arcuate bodies mounted on hubs and extending inwardly of said yoke toward each other, a yoke web portion having an arcuate upper surface spaced from the adjacent surfaces of said arcuate bodies a distance slightly or somewhat greater than the thickness of said base but not greater than the combined thickness of said base and the height of said lateral rib, a column supporting said yoke, and a base plate adapted to be detachably connected to a parts carrying hanger suspended therefrom, said arcuate bodies adapted to rotate in said slots on each side of said medial plate, said lower clevis member being manually detachably suspended from said upper clevis member by said arcuate bodies and said lateral ribs.

2. The plastic clevis device defined in claim 1, wherein:

each said upper and lower clevis member is integrally formed, unitary and molded of a plastic material.

3. The plastic clevis device defined in claim 1, wherein:

said lateral rib of said upper clevis member is substantially parallel with and spaced laterally outwardly from said medial plate a distance slightly greater than the thickness or length of said lower clevis member arcuate bodies.

4. The plastic device defined in claim 3, wherein:

said flange member lateral rib and base extend along a portion of the perimeter of said medial plate and having a substantially vertical straight portion along one lateral edge of said medial plate, a lower arcuate portion along the bottom edge, and an upwardly extending arcuate portion along the edge opposite said one edge of said medial plate, said slot in the lower section of said upper clevis member, where defined by said lower and upwardly curved portions, being arcuate.

5. The plastic device defined in claim 1, wherein:
the upper end portion of said upper clevis member is detachably connected to said trolley by removable fasteners.

6. The plastic device defined in claim 1, wherein:
said yoke comprises a pair of upstanding, substantially parallel, spaced apart trunnions, said hubs and arcuate bodies being co-axially mounted on and extending inwardly toward each other from the inner surfaces of said yoke trunnions, the distance between facing surfaces of said arcuate bodies being greater than the thickness of said medial plate. p1

7. The plastic device defined in claim 1, wherein: said arcuate bodies comprise cylinders of somewhat greater diameter than the diameters of their hubs, whereby said cylinders ride or rest on said bases of said slots.

8. The plastic device defined in claim 7, wherein:
the distance from the lower adjacent surface of said cylinders to the apex of said convexly crowned web portion is slightly or somewaht greater than the thickness of said base.

9. The plastic device defined in claim 1, wherein:
said lower clevis member column comprises a plurality of radial ribs spaced substantially equally apart and defining a like number of sections in said base plate, said column extending from and between said yoke web portion and said base plate.

10. The plastic device defined in claim 9, wherein:
said radial ribs are four in number, defining said base plate in quadrant sections.

11. The plastic device defined in claim 9, wherein:
each said section is provided with means for detachably securing said parts carrying hanger to said base plate.

12. The plastic device defined in claim 10, wherein:
each said section is provided with means for detachably securing said parts carrying hanger to said base plate.

* * * * *